United States Patent [19]
DeCoursey et al.

[11] Patent Number: 5,625,958
[45] Date of Patent: May 6, 1997

[54] METHOD AND A GAUGE FOR MEASURING THE SERVICE LIFE REMAINING IN A BLADE

[75] Inventors: Jonathan M. DeCoursey, East Hampton; Roland E. Morrissette, South Windsor; Fritz K. Smakula, Lebanon, all of Conn.

[73] Assignee: United Technologies Corporation, Hartford, Conn.

[21] Appl. No.: 524,192

[22] Filed: Sep. 6, 1995

[51] Int. Cl.$^6$ ................................................ G01B 5/00
[52] U.S. Cl. .......................... 33/555; 33/545; 33/833; 33/1 BB
[58] Field of Search .......................... 33/1 BB, 710, 33/712, 832, 833, 530, 545, 546, 548, 549, 555; 73/865.8

[56] References Cited

U.S. PATENT DOCUMENTS

| | | |
|---|---|---|
| 1,008,842 | 11/1911 | Mair . |
| 3,101,552 | 8/1963 | Tandler et al. ............................ 33/555 |
| 3,716,922 | 2/1973 | Shaver ..................................... 33/181 |
| 3,832,784 | 9/1974 | Samuels et al. ......................... 33/555 |
| 3,849,893 | 11/1974 | Ormsby ................................... 33/181 |
| 4,454,656 | 6/1984 | Arrigoni .................................. 33/174 |
| 4,665,625 | 5/1987 | Ireland et al. ........................... 33/549 |
| 4,718,172 | 1/1988 | Rouse et al. ............................. 33/530 |
| 5,313,714 | 5/1994 | Nakao ..................................... 33/522 |

FOREIGN PATENT DOCUMENTS

| | | | |
|---|---|---|---|
| 126576 | 11/1984 | European Pat. Off. ................ | 33/1 BB |
| 1030641 | 7/1983 | U.S.S.R. .................................. | 33/832 |
| 369878 | 3/1932 | United Kingdom ..................... | 33/530 |
| 578994 | 7/1946 | United Kingdom ..................... | 33/530 |

*Primary Examiner*—Thomas B. Will
*Attorney, Agent, or Firm*—Granetta M. Coleman

[57] ABSTRACT

An axial flow, turbofan gas turbine engine, generally, has a fan section, a compressor section, a combustor section, and a turbine section. An axially extending flow path for working medium gases extends through these sections. The compressor section includes an upstream low pressure compressor and a downstream high pressure compressor. The high pressure compressor is formed by a stator assembly and a rotor assembly. The rotor assembly has a plurality of airfoils or blades which extend radially outward from a rotor disk. During operation, the fan section draws in the working medium gases, as well as, sand. The sand abrades the blades and causes the blades to erode. In an effort to determine the service life remaining in a blade after erosion damage has been done, the present invention relates to a method and a gauge for measuring the service life remaining in a blade.

11 Claims, 5 Drawing Sheets

METHOD AND A GAUGE FOR MEASURING THE SERVICE LIFE REMAINING IN A BLADE

TECHNICAL FIELD

The present invention relates to gas turbine engines, and more particularly, to a method and a gauge for measuring the service life remaining in a blade of a gas turbine engine.

BACKGROUND OF THE INVENTION

Gas turbine engines for use in an aircraft are well known in the art. Generally, gas turbine engines are formed by a fan section, a compressor section, a combustor section, and a turbine section. A primary flow path for working medium gases extends serially through these sections. A secondary flow path for working medium gases extends rearwardly, radially outward of the primary flow path.

The compressor section includes an upstream low pressure compressor and a downstream high pressure compressor. Both compressors are formed by a stator assembly and a rotor assembly. The rotor assembly has a plurality of airfoils or blades which extend radially outward from a rotor disk. Each blade generally has a root region, an opposed tip, and a midspan region disposed therebetween. The midspan region includes an upstream leading edge extending from the root region to the tip, a downstream trailing edge extending from the root region to the tip and spaced from the leading edge and pressure and suction surfaces extending between the leading and trailing edges.

In operation, the working medium gases flow along the primary flow path and enter the compressor section where the gases are compressed. These compressed gases are burned in the combustor section and discharged to the turbine section. The turbine section extracts work from the gases to power the compressor and fan sections. The fan section draws in the working medium gases along the flow paths and raises the pressure of the gases to produce thrust.

Particularly during take off and landing, as the fan section draws in the working medium gases it also sucks in sand. The sand abrades the blades as it moves past them causing the blades to erode. Therefore, it is industry practice to check the blades for erosion damage during comprehensive maintenance operations. The time between comprehensive maintenance operations is designated as a full run of service life. A stub run of service life is half a full run. The number of hours in a full run of service life varies according to the engine's operating conditions.

For blades that erode at the trailing edge before they erode at the leading edge, the blade erosion check includes several procedures. First, an inspector visually inspects the contour of blade. If the inspector determines that the contour toward the trailing edge is too sharp the blade must be scrapped (i.e., cannot be returned to service). Second, the inspector measures each blades' chord length. The chord length is the straight line distance between the leading edge and the trailing edge. If the inspector determines that the chord length for the blade is less than a minimum chord length the blade must be scrapped. Third, on some engines, the inspector measures each blades' thickness at least at one point, which is a predetermined distance from the trailing edge and the blade tip. If the inspector determines that the thickness at that point is less than a minimum blade thickness, the blade must be scrapped.

There are several problems with the aforementioned procedures. First, visually inspecting the contour of the blade for a contour that is too sharp allows too much subjectivity to enter into the measurement. This subjectivity leads to inconsistency in results from inspector to inspector depending on a number of factors, such as the inspector's experience.

Second, measuring the chord length only allows the inspector to decide whether the blade should or should not be returned to service. In certain engines once a blade wears at the trailing edge and the chord length diminishes beyond a critical chord length, the blade deteriorates more rapidly than before. Thus, if this type of blade is returned to service because its chord length is greater than the minimum chord length, and during service the blade erodes at the trailing edge to the critical chord length the blade may deteriorate quickly thereafter and engine performance will decrease. Since the blade was returned to service without a time limit, the poorly performing blade will remain in the engine until the next comprehensive maintenance operation. Inspectors usually do not scrap blades that have a chord length close to the critical chord length, because good blades may be scrapped accidentally and the inspector who must justify every decision to scrap a blade, may have a difficult time justifying scrapping a blade that passed the blade erosion check procedures.

Third, since the trailing edge on each blade eroding differently, the inspector never measures the blade thickness at the same point, which is measured from the trailing edge. This leads to inconsistency in measurements from blade to blade. Also measuring at a point could lead to an incorrect decision to return or not to return a blade to service because an anomaly in the blade width that does not indicate erosion, but a manufacturing or operating aberration could be misinterpreted. Although the effects of an anomaly in the blade width are minimized by taking the thickness measurement at two points which some inspectors do according to procedure, misinterpretation can still occur.

Lastly, the current check cannot be performed on the blades until they are removed from the rotor assembly. Since there are numerous blades requiring inspection, removal of the blades is labor intensive and time consuming. If the blade does not have significant erosion damage, its removal for inspection is inefficient.

More accurately determining the service life remaining in a blade will allow blades that previously would have been scrapped to be return to service. Determining the amount of service life remaining in a blade will allow only those blades, which are in adequate condition to remain in service for a significant time without significant reduction in performance to be returned to service. A method and a gauge which does not require removing all the blades from the rotor assembly before checking them, thus requiring only those blades that need to be replaced, to be removed would save time on maintenance. All the aforementioned improvements would result in significant cost savings. Therefore, scientists and engineers have been searching for an inexpensive, repeatable, and efficient method and a gauge for measuring the service life remaining in a blade.

SUMMARY

According to the claims of present invention, a method and a gauge for measuring the service life remaining in a blade of a gas turbine engine is disclosed. The method and gauge are for use with a blade having a root region, an opposed tip, a midspan region disposed therebetween. The midspan region includes a leading edge extending from the root region to the tip, and a trailing edge extending from the root region to the tip and spaced from the leading edge. The method comprising the steps of locating a point a predetermined distance from the tip of the blade where the blade is characterized by a predetermined thickness and measuring the distance from the point to the trailing edge of the blade. Then comparing the distance obtained with a predetermined correlation between a given set of distances and the remaining blade service life to determine the remaining blade service life. Another embodiment of the method further includes the step of empirically determining the correlation between the given set of distances and the remaining blade service life prior to comparing the distance to the correlation.

The gauge includes a first stop for positioning the blade in the spanwise direction; a second stop for positioning the blade at a point along the chordal direction a predetermined distance from the tip of the blade where blade is characterized by a predetermined thickness, and means for measuring a distance from the point to the trailing edge, such that the distance indicates the remaining blade service life. In one embodiment the gauge includes U-shaped housing including two spaced parallel side walls joined by a rear wall. The first stop includes a rod extending between the side walls of the housing. The second stop including two posts, each post being engaged with one of the side walls of the housing to form a gap therebetween. One of the posts may be replaced with a micrometer. In this embodiment the means for measuring included a movable rod extending through the rear wall of the housing, the rod having a graduation for dividing the rod into a plurality of regions or a digital indicator including a movable rod extending through the rear wall of the housing. Such that upon insertion of the blade into the housing the blade moves either the movable rod and the regions visible protruding from the rear wall or the digital indicator indicates the distance from the point to the trailing edge.

The foregoing invention will become more apparent in the following detailed description of the best mode for carrying out the invention and in the accompanying drawing.

BEST MODE FOR CARRYING OUT THE INVENTION

Figure 1:
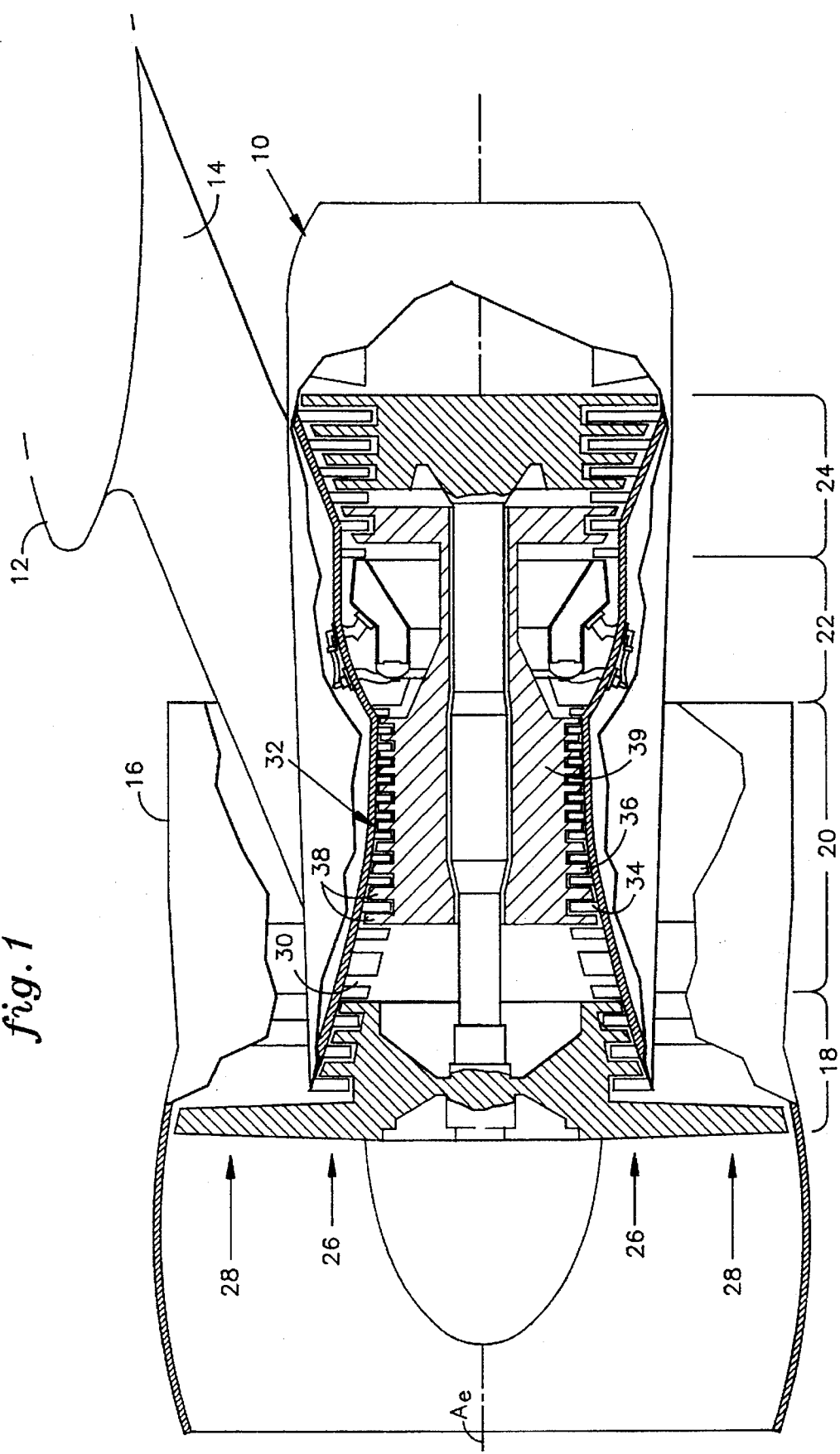
FIG. 1 is a side elevation schematic representation of an axial flow, gas turbine engine for an aircraft.

Referring to FIG. 1, a pylon 10 extends from a portion of a wing 12. A nacelle 14 is attached to the pylon 10. The nacelle 14 circumscribes a gas turbine engine 16 and is adapted to support and position the engine from the pylon 10.

The gas turbine engine 16 includes a fan section 18, a compressor section 20, a combustor section 22, and a turbine section 24. The sections are disposed about an axis $A_e$ of the engine, which extends axially rearwardly therethrough. A primary flow path 26 for working medium gases extends serially through these sections. A secondary flow path 28 for working medium gases extends rearwardly, radially outward of the primary flow path 26.

The compressor section 20 includes an upstream low pressure compressor 30 and a downstream high pressure compressor 32. The high pressure compressor 32 is formed by a stator assembly 34 and a rotor assembly 36. The rotor assembly 36 has a plurality of blades represented by the blade 38, which extend radially outward from a rotor disk 39 across the primary working medium flow path 26. Arrays of blades are at spaced axial locations, and the array of blades disposed at the same axial location belong to the same stage.

During operation of the aircraft, the working medium gases flow along the primary flow path 26 and enter the compressor section 20 where the gases are compressed. These compressed gases are burned in the combustor section 22 and discharged to the turbine section 24. The turbine section 24 extracts work from the gases to power the compressor section 20 and fan section 18. The fan section 18 draws in the working medium gases along the flow paths 26 and ;28, and raises the pressure of the gases to produce thrust.

Figure 2:
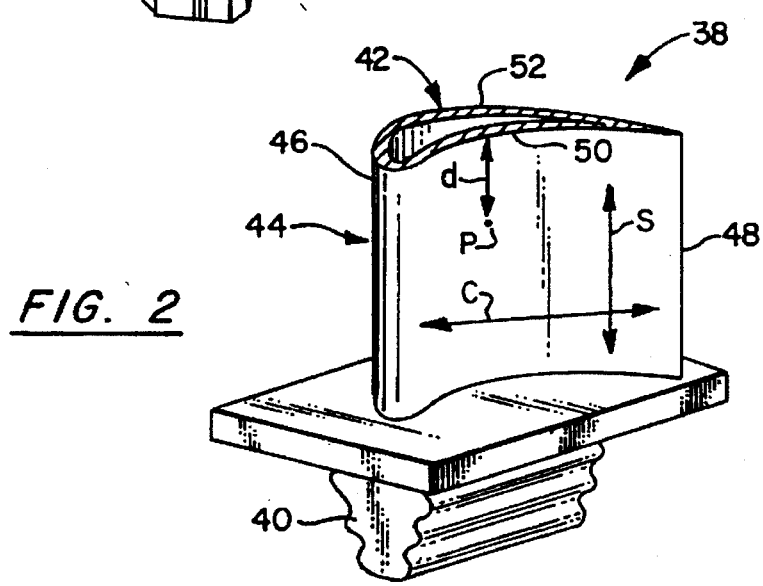
FIG. 2 is a perspective view of a high pressure compressor blade for use with the present invention.

Now referring to FIG. 2, a blade 38 has a root region 40, an opposed tip 42, and a midspan region 44 disposed therebetween. The midspan region 44 has an upstream leading edge 46 extending from the root region to the tip, a downstream trailing edge 48 extending from the root region to the tip and spaced from the leading edge, and pressure and suction surfaces 50 and 52 extending between the leading edge 46 and the trailing edge 48. The blade further has a spanwise direction extending between the tip and the root region, as indicated by the arrow S; a chordal direction extending between the leading edge and the trailing edge, as indicated by the arrow C; and a point P a predetermined distance d from the tip, where the blade is characterized by a predetermined thickness t (not shown). The blade's thickness t is the distance between the pressure and suction surfaces 50 and 52.

Figure 3:
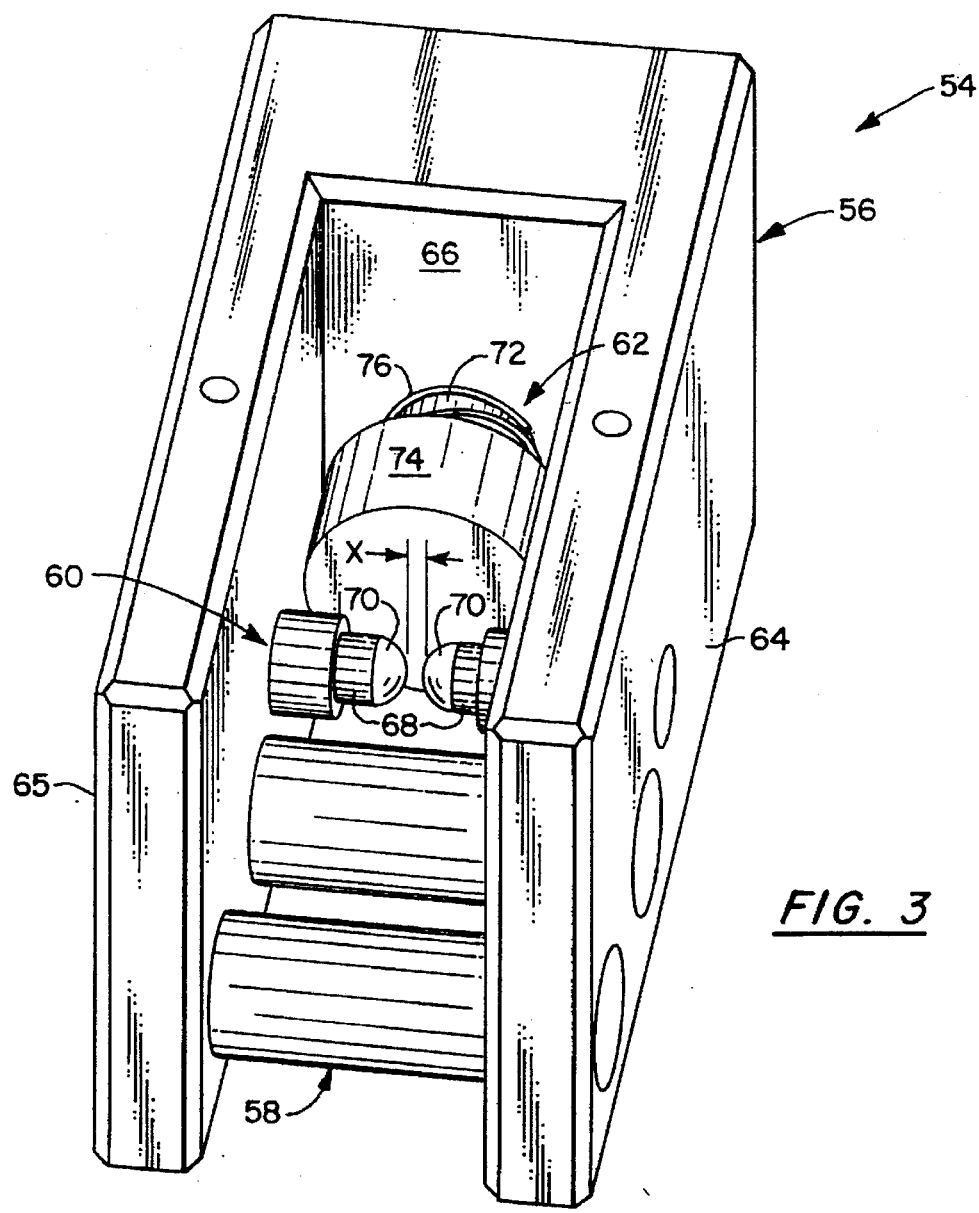
FIG. 3 is a perspective view of one embodiment of a gauge of the present invention.
Figure 4:
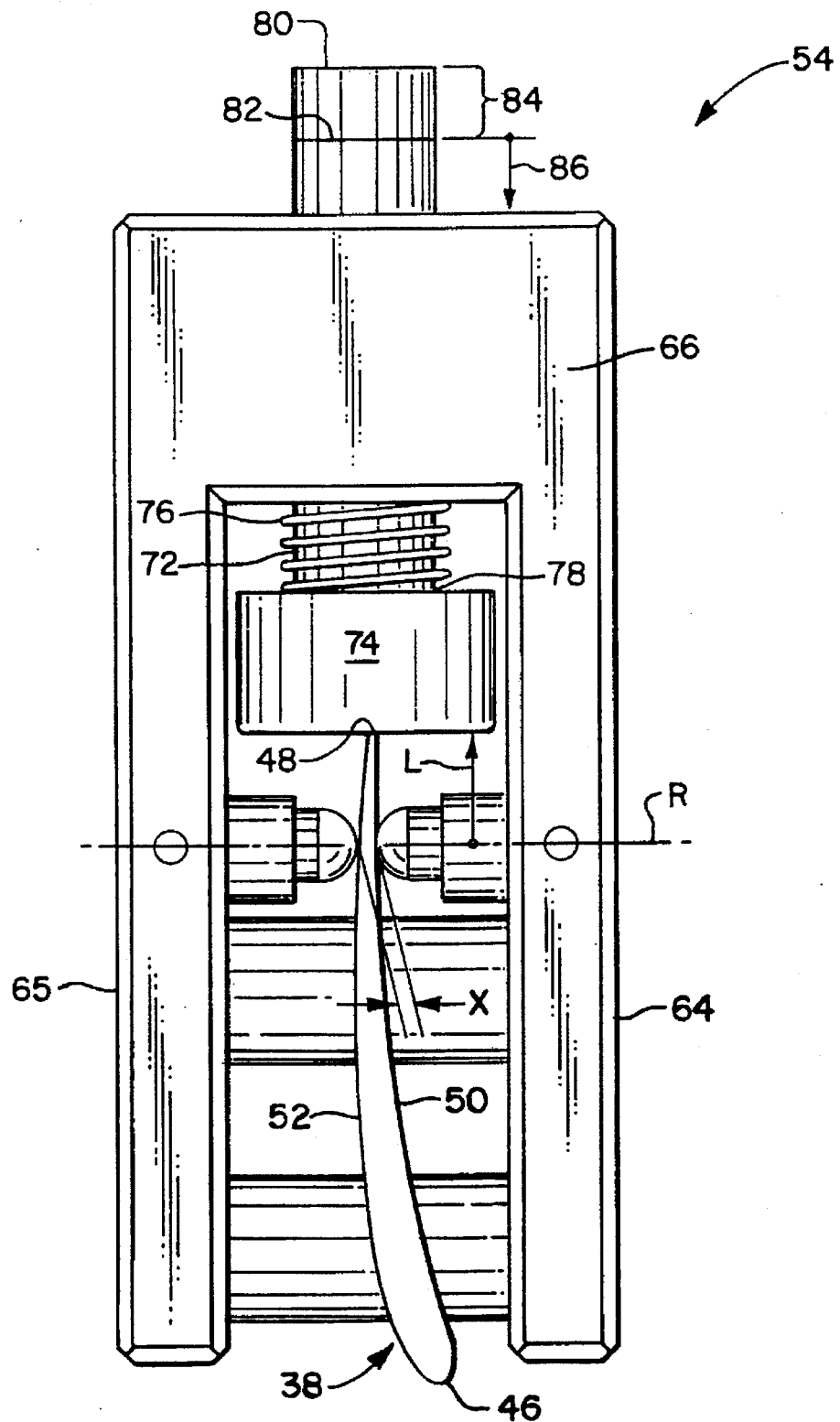
FIG. 4 is a plan view of the gauge shown in FIG. 3 with the blade of FIG. 2 inserted therein.
Figure 5:
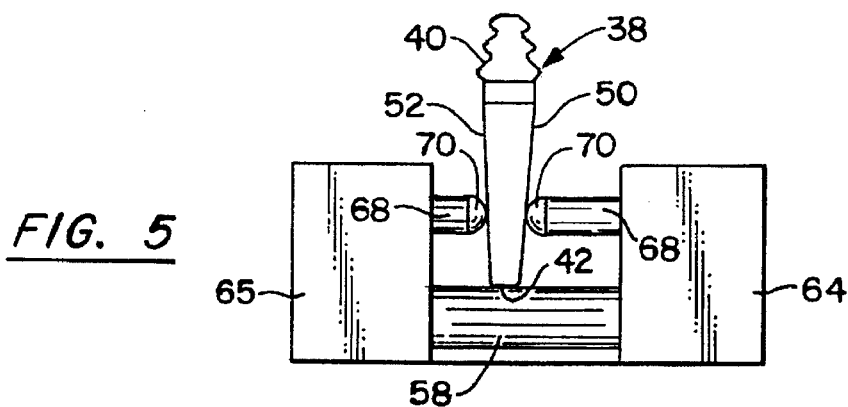
FIG. 5 is a front view of the gauge shown in FIG. 3 with the blade of FIG. 2 inserted therein.

Referring now to FIGS. 2–4, a gauge 54 includes a housing 56, a first stop 58, a second stop 60, and a means for measuring a distance 62. The housing 56 supports the other elements of the gauge. The housing 56 is a U-shaped integral wall structure which includes side walls 64 and 65, and a rear wall 66. The housing can be formed from a piece of stainless steel using conventional machining techniques.

The first stop 58 for positioning the blade 38 in the spanwise direction S (as shown in FIG. 2) is connected to and extends between the side walls 64 and 65. In this embodiment, the first stop includes two cylindrical rods; however any element that supports the blade upon insertion can be used. It is preferred that the blade be supported at two points of contact, thus preferably two rods are used.

The second stop 60 for positioning the blade 38 along the chordal direction C at a point P, is connected to and extends from the side walls 64 and 65. In this embodiment, the second stop includes two posts 68. Each post being engaged with one of the side walls. The free ends of the posts have rounded tips 70 attached thereto. A gap X extends between the rounded tips 68. A reference axis R extends through the gap perpendicular to the side walls.

The means for measuring the distance 62 includes a movable rod 72, a measuring tip 74, and a spring 76. The rod 72 extends through the rear wall 66. The rod 72 has a first end 78 disposed between the side walls, an opposed second end 80, and a graduation 82 spaced therebetween. The graduation 82 divides the rod into regions. The first region 84 extends between the second end 80 and the graduation 82. The second region 86 extends between the graduation and the first end 78.

The measuring tip 74 is attached to the first end 78 of the rod 72. The spring 76 surrounds the rod 72 and extends from the measuring tip 74 to the rear wall 66. The rod 72 has an initial position, where the measuring tip 74 is aligned with the reference axis R.

A correlation between a given set of distances and the remaining blade life can be empirically or theoretically determined for a particular engine and may vary with each blade.

Inspection of the blade 38 with the gauge 54 will now be discussed. Referring to FIGS. 1–5, using the gauge 54 the blade 38 should be inspected while apart of the rotor assembly 36. The blade 38 is inserted into the gauge 54 using moderate pressure so that the blade's trailing edge 48 enters the open end of the housing. The blade tip 42 should be placed in contact with both of the rods of the first stop 58. The pressure surface 50 of the blade will be toward the side wall 64. The blade's trailing edge 48 is disposed between the rounded tips 70 of the second stop 60. The blade contacts and moves the measurement tip 74 toward the rear wall 66 causing the rod 72 to move. As the measuring tip moves, the rod 72 may protrude from the rear wall of the housing. Thus insertion of the blade displaces the measuring tip from the reference axis R the length L. The blade will travel into the housing until the thickness of the blade is equal to the gap X. This thickness occurs when the point P on the blade is aligned with the reference axis R, so that the length L corresponds to the distance from the point P to the trailing edge of the blade.

While maintaining contact between the blade tip 42 and the first stop 58, the inspector should search for the greatest length L or the greatest protrusion of the rod. The amount of service life remaining in the blade will be determined, when the blade is in that position. Since the correlation between the set of distances from the point P to the trailing edge has been used to locate the regions 84 and 86 on the rod 72, the inspector should determine the amount of service life remaining in the blade by determining the amount of the rod 72 extending or not extending from the rear wall 66. If the second end 80 of the rod is flush with the rear wall or is not protruding from the housing, the blade has a service life remaining of at least a full run. If only the first region 84 is visible, the blade has a service life remaining of at least a stub run. If the second region 86 is visible, the blade has a service life remaining of less than a stub run and the blade should be scrapped.

After the service life remaining has been determined, the gauge 54 should be removed from the blade and consequently the measuring tip 74 via the spring 76 will return to the initial position. This inspection should be repeated to determine the service life remaining for the other blades in the same stage. Once the inspector is ready to measure blades from a different stage, another hand-held, portable gauge having a gap X corresponding to that stage must be used.

Figure 6:
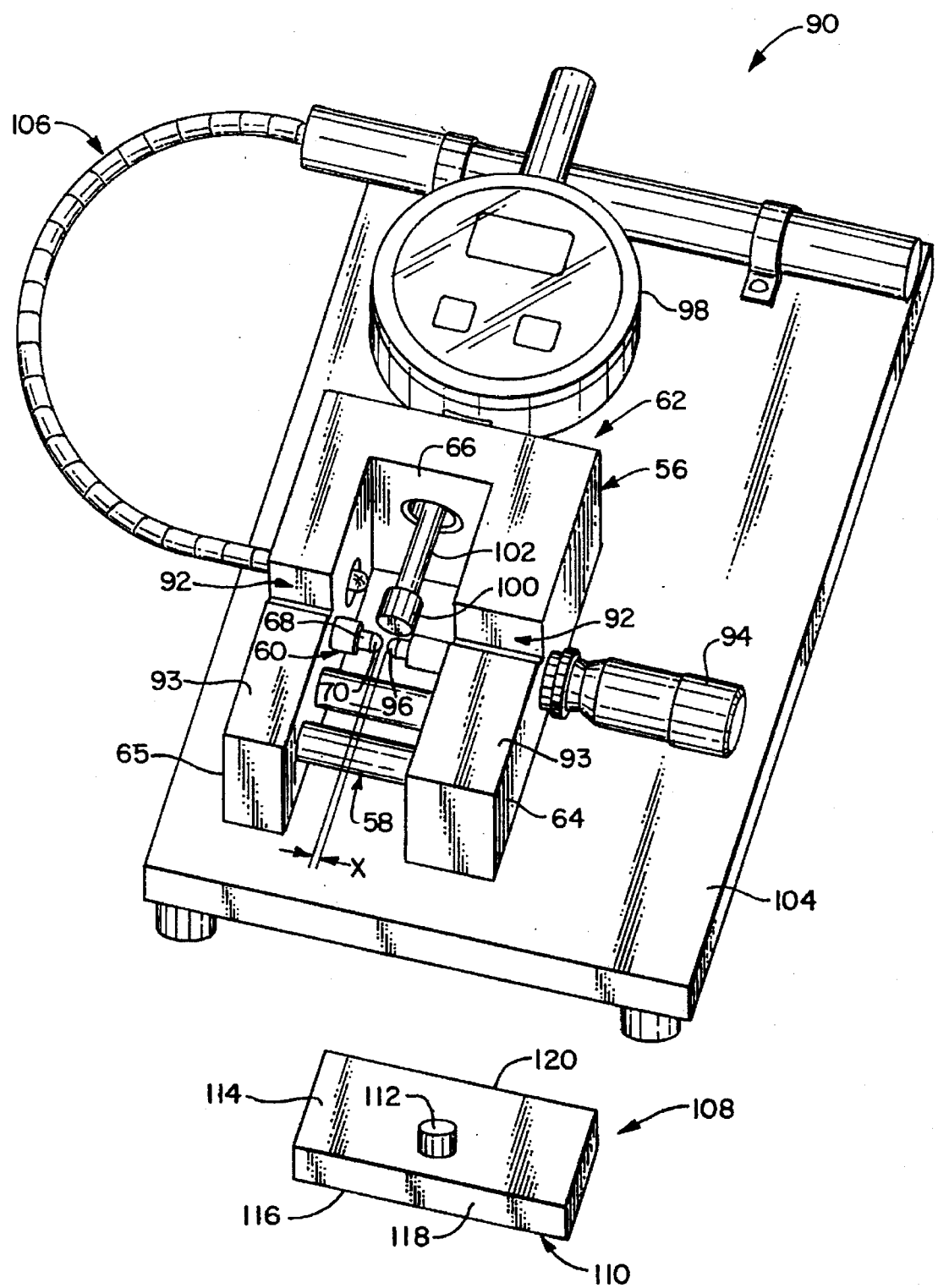
FIG. 6 is a perspective view of another embodiment of a gauge of the present invention with a calibration tool laying next to the gauge.

Looking now at FIG. 6, the gauge 90 is similar to that shown in FIG. 3 except for the following modifications. The housing 56 has been modified so that the two side walls 64 and 65 have stepped stop regions 92. The housing also has an upper surface 93.

The post 68 of the second stop 60 in the side wall 64 has been replaced with a micrometer 94. The micrometer has a rounded tip 96 attached to the free end. The micrometer allows the gap X to be adjustable.

The means for measuring a distance 62 has been changed to include a digital indicator 98 and a measuring tip 100. The digital indicator 98 can be replaced with any linear measuring indicator that measures a displacement with sufficient accuracy. In the current embodiment, the digital indicator includes a spring-loaded movable rod 102, which extends through the rear wall 66. The measuring tip 100 is attached to the free end of the rod 102. The digital indicator is commercially available and manufactured by Starrett under the name Digital Indicator model #2500-5.

Further additions to the gauge 90 include a base 104 and an illumination assembly 106. The base 104 supports the elements of the gauge. The illumination assembly 106 allows the area defined within the walls of the housing to be well lit. The illumination assembly need not be included in the gauge or used, if there is sufficient ambient light. The illumination assembly is commercially available from McMaster-Carr Supply Company, under the name Inspection Light and the model #6586T2.

The gauge 90 must be calibrated using a calibration tool 108. The calibration tool includes a base 110 and a pin 112. The base 110 is rectangular and has a first surface 114, an opposed second surface 116, a first edge 118, and an opposed second edge 120. The pin 112 extends from the first surface 114, and is disposed between the first and second edges 118 and 120.

Figure 7:
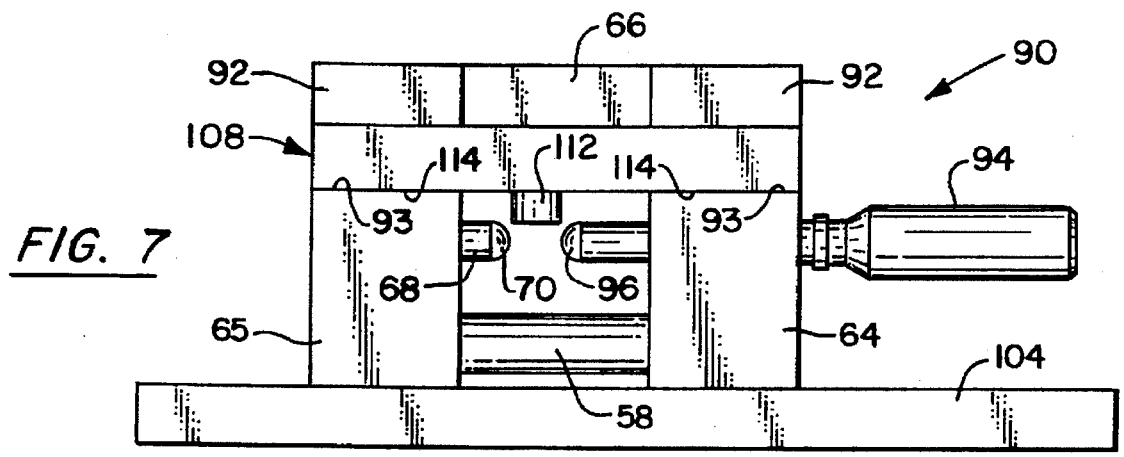
FIG. 7 is a front view of the gauge shown in FIG. 6 with the calibration tool shown in FIG. 6 disposed thereon.
Figure 8:
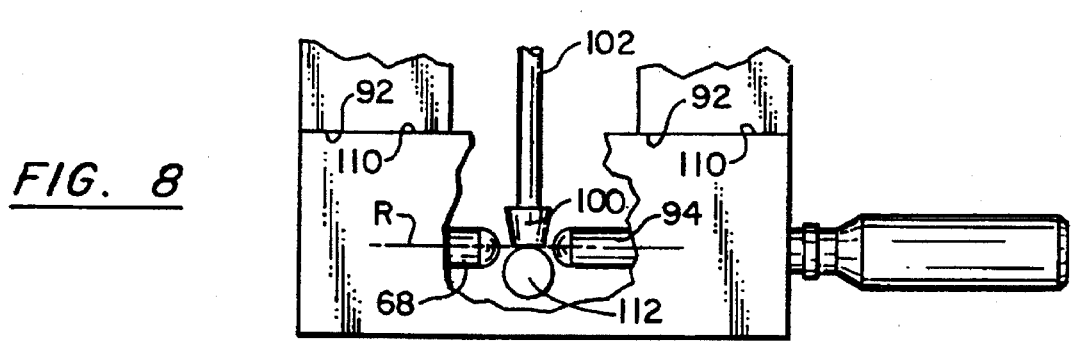
FIG. 8 is a partial plan view of the gauge shown in FIG. 6 with the calibration tool shown in FIG. 6 disposed thereon and partially cut away for clarity.

The calibration of the gauge 90 will now be described. Referring to FIG. 6, the gauge 90 should be placed on a level surface like a bench. If there is insufficient ambient light the illumination assembly 106 may be turned on. Next, the micrometer 94 should be manipulated until the gap X corresponds to the stage of the blade to be tested. Turning now to FIGS. 7 and 8, the calibration tool 108 should be placed on the gauge 90. The first surface 118 of the tool should be in contact with the upper surfaces 93 of the housing, and the first edge 118 should abut the stepped stop regions 92. In this position the pin 112 should be disposed above the post 68 and the micrometer 94, and the pin should depress the rod 102, so that the free end of the measuring tip 100 is aligned with the reference axis R. While firmly holding the tool in this position, the inspector should turn the digital indicator on, thus setting zero on the digital indicator. Zero being when the measuring tip is aligned with the reference axis R. With calibration complete, the tool should be removed slowly, consequently causing the measuring tip 100 to move forward from the reference axis R. When the measuring tip moves forward of the reference axis R (i.e., toward the open end of the housing), the digital indicator should display a positive number. The greater the positive number or the magnitude of the distance displayed the further the tip is from the reference axis.

Inspection of the blade 38 with the gauge 90 will now be discussed. Referring to FIGS. 1, 2 and 6, using the gauge 90 the blade 38 is inspected after its removal from the rotor assembly 36. The blade 38 is inserted into the gauge 90, in the same fashion as that discussed with respect to FIGS. 3–5. The measuring tip 100 should move rearwardly from the reference axis R (i.e., away from the open end of the housing) due to contact with the blade, and the digital indicator 98 should display a negative number. The greater the negative number or the magnitude of the distance displayed further the tip is from the reference axis.

While maintaining contact between the blade tip 42 and the first stop 58, the inspector should search for the greatest distance or length L. The inspector should record the distance measurement from the digital indicator when the blade is in that position. The correlation between the given set of distances and the remaining blade service life can be utilized with the gauge 90 by creating a chart indicating the distances that correspond to various remaining blade service lives. These distance values can be designated as a full run limit and a stub run limit or any other desired limits established from the empirical or theoretical correlation. The inspector will compare the recorded distance to these limits. If the recorded distance is equal to or less than the full run limit, the blade is robust and has a full run or more of service live remaining. If the recorded distance is greater than the full run limit but less than or equal to the stub run limit, the blade has a stub run of service life remaining. If the recorded distance is greater than the stub run limit, the blade has a service life remaining of less than a stub run and the blade should be scrapped.

After the service life remaining has been determined, the blade 38 should be removed from the gauge 90. The measuring tip 100 will return to its initial position due to the rod of the digital indicator being spring-loaded. This inspection measurement should be repeated to determine the service life remaining for the other blades in the same stage. Once the inspector is ready to measure blades from a different stage, the gap X must be adjusted by manipulating the micrometer 94, until the gap corresponds to the blade stage being inspected. In addition, the gauge must be re-calibrated.

The present invention has several advantages. The principal advantages of the aforementioned method of measuring the service life remaining in a blade are that the method is repeatable and uses a criteria that is objectively measurable. Another advantage to the current method is that it not only allows inspectors to determine whether a blade should be scrapped or returned to service, but it tells the inspector how long a blade may remain in service after it is returned to service before engine performance may be significantly affected by subsequent erosion of the blade.

The principal advantage of the gauge is that it is relatively simple and inexpensive to make, and can be manufactured in a hand-held or bench embodiment. The hand-held embodiment has the additional advantage of not requiring the blade to be removed from the rotor assembly prior to inspection.

While a particular invention has been described with reference to illustrated embodiments, this description is not meant to be construed in a limiting sense. It is understood that although the present invention has been described in preferred embodiment, various modifications of the illustrative embodiments, as well as additional embodiments of the invention, will be apparent to persons skilled in the art upon reference of this description without departing from the spirit and scope of the invention, as recited in the claims appended hereto. These modifications include but are not limited to using a linear scale, dial indicator, or a low voltage transducer as the means for measuring a distance; measuring blades of an intergrally bladed rotor, whose root region is stubbed; and measuring blades other than high pressure compressor blades, for which the relationship between service life remaining and the distance from a point to the trailing edge of the blade can be determined. It is therefore contemplated that the appended claims will cover any such modification or embodiments that fall within the true scope of the invention.

We claim:

1. A method of measuring the service life remaining in a blade of a gas turbine engine, the blade having a root region, an opposed tip, a midspan region disposed therebetween, the midspan region includes a leading edge extending from the root region to the tip, and a trailing edge extending from the root region to the tip and spaced from the leading edge, said method comprising the steps of:

a. locating a line along the blade a predetermined distance from the tip of the blade;

b. locating a point along the line where the point is characterized by the blade having a predetermined thickness;

c. measuring the distance from the point to the trailing edge of the blade; and d. comparing the distance obtained in step (c) with a predetermined correlation between a given set of distances and the remaining blade service life, to determine the remaining blade service life.

2. The method of claim 1, wherein the method further comprises the step of empirically determining the correlation between the given set of distances and the remaining blade service life prior to step (d).

3. A gauge for measuring service life remaining in a blade of a gas turbine engine, the blade having a root region, an opposed tip, a midspan region disposed therebetween, the midspan region including a leading edge extending from the root region to the tip, a trailing edge extending from the root region to the tip and spaced from the leading edge, a spanwise direction extending between the root region and the tip, and a chordal direction extending between the leading edge and the trailing edge, the gauge comprising:

a first stop for positioning the blade in the spanwise direction;

a second stop for positioning the blade at a point along the chordal direction a predetermined distance from the tip of the blade where the blade is characterized by a predetermined thickness; and means for measuring a distance from the point to the trailing edge, such that the distance indicates the remaining blade service life.

4. The gauge of claim 3, wherein the gauge further comprises:

a U-shaped housing including two spaced parallel side walls joined by a rear wall;

the first stop including a rod extending between the side walls of the housing; and the second stop including two posts, each post being engaged with one of the side walls of the housing to form a gap therebetween.

5. The gauge of claim 4, wherein the means for measuring further comprises:

a movable rod extending through the rear wall of the housing, said rod having a graduation for dividing the rod into a plurality of regions, whereby upon insertion of the blade into the housing the blade moves the movable rod and the region protruding from the rear wall indicates the distance from the point to the trailing edge.

6. The gauge of claim 4, wherein the means for measuring further comprises:

a digital indicator including a movable rod extending through the rear wall of the housing, whereby upon insertion of the blade into the housing the blade moves the movable rod and the digital indicator indicates the distance from the point to the trailing edge.

7. The gauge of claim 3, wherein the gauge further comprises:

a U-shaped housing including two spaced parallel side walls joined by a rear wall;

the first stop including a rod extending between the side walls of the housing; and the second stop including a post engaged with one side wall of the housing and a micrometer engaged with the other side wall of the housing to form a gap therebetween.

8. The gauge of claim 7, wherein the means for measuring further comprises:

a movable rod extending through the rear wall of the housing, said rod having a graduation for dividing the rod into a plurality of regions, whereby upon insertion of the blade into the housing the blade moves the movable rod and the region protruding from the rear wall indicates the distance from the point to the trailing edge.

9. The gauge of claim 7, wherein the means for measuring further comprises:

a digital indicator including a movable rod extending through the rear wall of the housing, whereby upon insertion of the blade into the housing the blade moves the movable rod and the digital indicator indicates the distance from the point to the trailing edge.

10. A gauge for measuring service life remaining in a blade of a gas turbine engine, the blade having a root region, an opposed tip, a midspan region disposed therebetween, the midspan region including a leading edge extending from the root region to the tip, a trailing edge extending from the root region to the tip and spaced from the leading edge, a spanwise direction extending between the root region and the tip, and a chordal direction extending between the leading edge and the trailing edge, the gauge comprising:

a U-shaped housing including two spaced parallel side walls joined by a rear wall;

a first stop for positioning the blade in the spanwise direction, the first stop including a rod extending between the side walls of the housing;

a second stop for positioning the blade at a point along the chordal direction where the blade is characterized by a predetermined blade thickness at a predetermined distance from the tip of the blade; the second stop including two posts, each post being engaged with one of the side walls of the housing to form a gap therebetween; and a movable rod extending through the rear wall of the housing, said rod having a graduation for dividing the rod into a plurality of regions, whereby upon insertion of the blade into the housing the blade moves the movable rod and the region protruding from the rear wall indicates the distance from the point to the trailing edge.

11. A gauge for measuring service life remaining in a blade of a gas turbine engine, the blade having a root region, an opposed tip, a midspan region disposed therebetween, the midspan region including a leading edge extending from the root region to the tip, a trailing edge extending from the root region to the tip and spaced from the leading edge, a spanwise direction extending between the root region and the tip, and a chordal direction extending between the leading edge and the trailing edge, the gauge comprising:

a U-shaped housing including two spaced parallel side walls joined by a rear wall;

a first stop for positioning the blade in the spanwise direction, the first stop including a rod extending between the side walls of the housing;

a second stop for positioning the blade at a point along the chordal direction where the blade is characterized by a predetermined blade thickness at a predetermined distance from the tip of the blade; the second stop including a post engaged with one side wall of the housing and a micrometer engaged with the other side wall of the housing to form a gap therebetween; and a digital indicator including a movable rod extending through the rear wall of the housing, whereby upon insertion of the blade into the housing the blade moves the movable rod and the digital indicator indicates the distance from the point to the trailing edge.

* * * * *